W. M. HENSON.
SEED SCREENING AND SELECTING MEANS FOR COTTON GINS.
APPLICATION FILED MAR. 6, 1917.
1,251,520.
Patented Jan. 1, 1918.
2 SHEETS—SHEET 1.
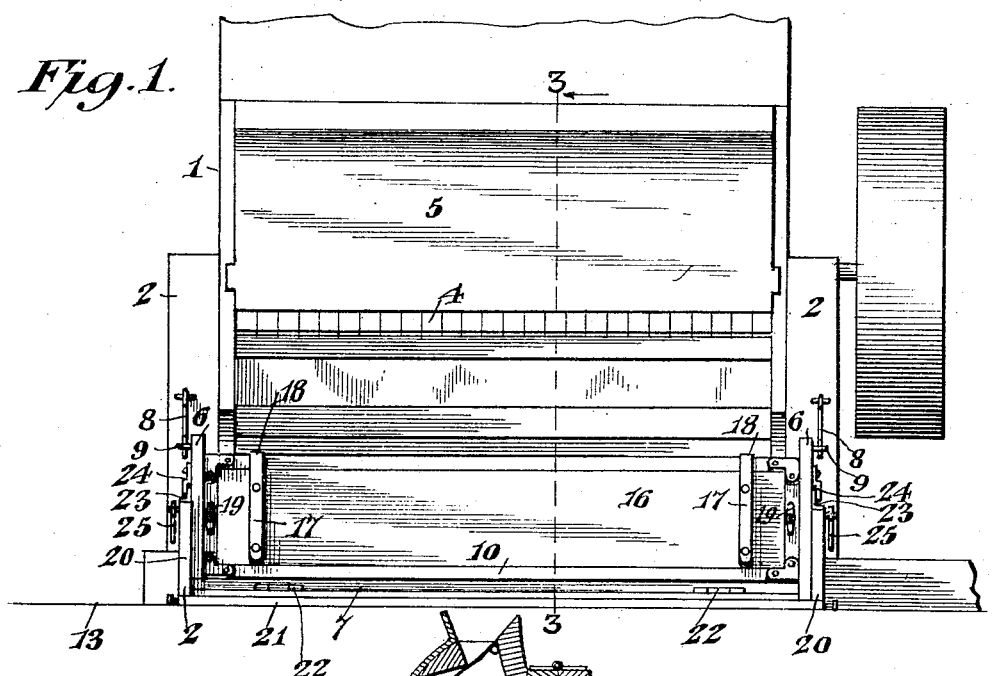
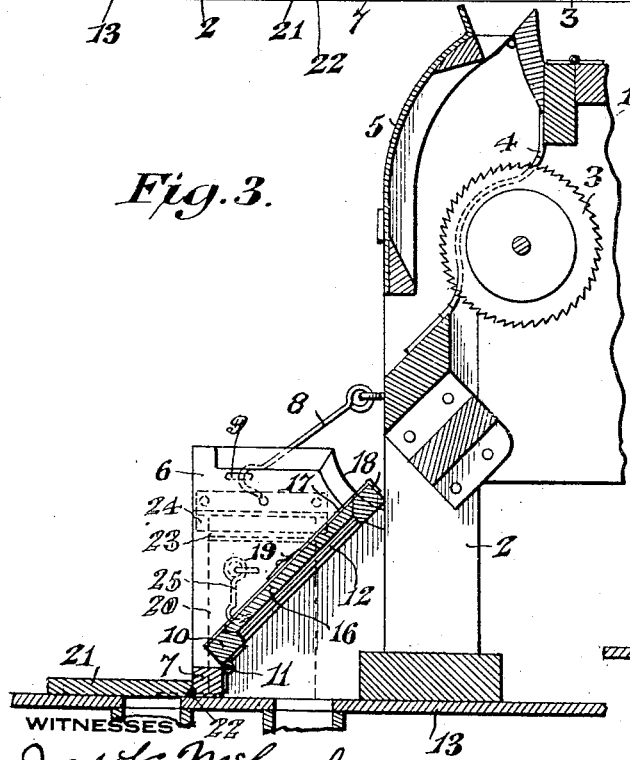
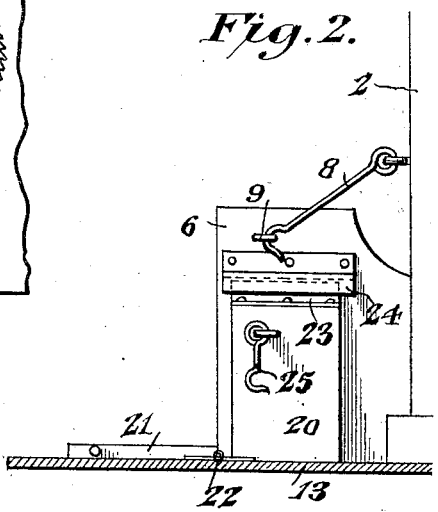
WITNESSES
Jas. K. McCathran
H. T. Chapman
INVENTOR
W. M. Henson,
BY
C. G. Siggers
ATTORNEY

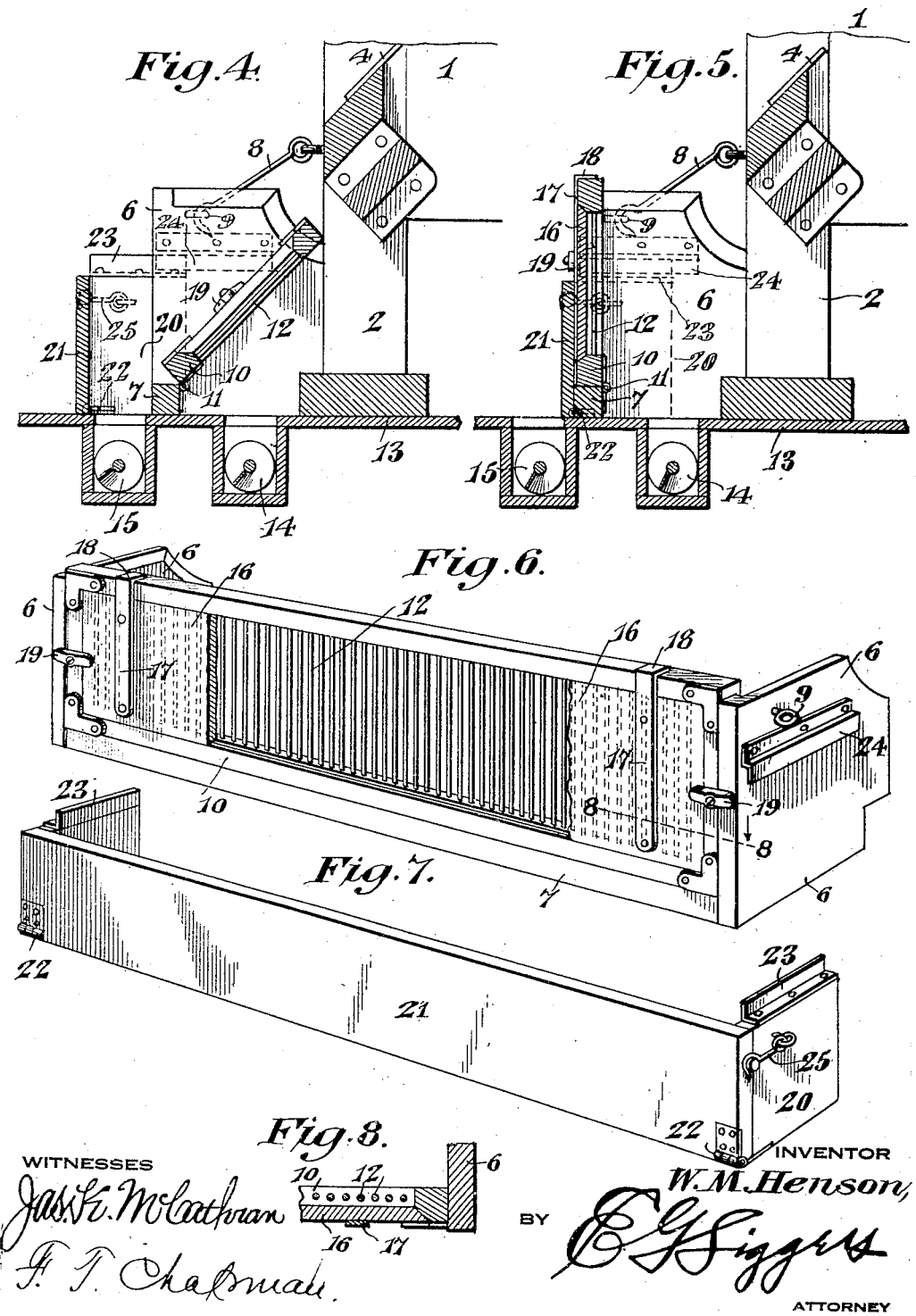

UNITED STATES PATENT OFFICE.

WILLIAM MARION HENSON, OF SAVOY, TEXAS.

SEED SCREENING AND SELECTING MEANS FOR COTTON-GINS.

1,251,520.  Specification of Letters Patent.  Patented Jan. 1, 1918.

Application filed March 6, 1917. Serial No. 152,857.

*To all whom it may concern:*

Be it known that I, WILLIAM M. HENSON, a citizen of the United States, residing at Savoy, in the county of Fannin and State of Texas, have invented a new and useful Seed Screening and Selecting Means for Cotton-Gins, of which the following is a specification.

This invention has reference to seed screening and selecting means for cotton gins and its object is to provide for the cleaning of the seed from burs or other deleterious matter, or selecting certain batches of seed as may be desired.

The invention is in the nature of an attachment capable of being applied to different types of cotton gins, and is provided with an adjustable screen having a removable cover board, the screen being lodged in a hopper so constructed as to fit and be readily attached to the front of a cotton gin, while a part of the hopper is movable and arranged to either direct the seed to a conveyer or to cover such conveyer so that seed delivered from the gin stand is prevented from reaching the conveyer, thus permitting the seed from chosen batches of cotton to be saved for planting purposes.

With the structure of the invention the seed as it comes from the gin or the seed freed from hulls or burs may be directed to a conveyer, and in the latter case the burs or hulls are directed to another conveyer for suitable disposition.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a front elevation of a portion of a cotton gin stand with the invention applied.

Fig. 2 is an end elevation of the structure shown in Fig. 1, but omitting some parts of the cotton gin stand illustrated in Fig. 1.

Fig. 3 is a section on the line 3—3 of Fig. 1.

Fig. 4 is a view similar to Fig. 3, but showing the improvement somewhat differently arranged.

Fig. 5 is a view also similar to Figs. 3 and 4, but showing another use of the invention.

Fig. 6 is a perspective view of a portion of the invention separate from the cotton gin.

Fig. 7 is a perspective view of another portion of the invention.

Fig. 8 is a section on the line 8—8 of Fig. 6.

Referring to the drawings there is shown a portion of a cotton gin stand 1 of known construction, and therefore needing no particular description, certain parts being referred to only for a complete understanding of the invention. To locate the parts there are shown side posts 2 carrying a framework in which are mounted gin saws 3, a grate 4 through which the saws work, and a seed board 5, all these parts being found in various forms of gin stands. It will be understood that the invention is applicable to a gang of cotton gins, but is shown as applied to one without limitation of the use of the invention to such specific arrangement.

The invention comprises a seed hopper composed of end boards 6 joined near what constitutes the lower front ends in use by a bar 7. The end boards 6 are shaped to fit against the outer faces of the posts 2 of the cotton gin, while hooks 8 carried by the posts 2 and eyes 9 on the boards 6 provide means for detachably connecting the hopper to the seed discharging portion of the cotton gin. Such fastening means are to be taken as indicative of any suitable fastening means and as not confining the fastening means necessarily to hooks and eyes.

Connected to the bar 7 is one edge of a frame 10, the connecting means being shown as consisting of hinges 11. The frame 10 is of such size as to fit in the space between the end boards 6 and extend from the top of the bar 7 to about the top of the boards 6. Thus when the frame is upright it constitutes the outer wall of the hopper. The length of the boards 6 in a direction away from the gin is such that the frame 7 may be tilted on its hinges 11 until the upper edge of the frame rests against the posts 2, in which position the frame is then at an angle of about fortyfive degrees, but such particular angle is not obligatory. Moreover, when the frame is so tilted it is in the path of cotton seed gravitating from the cotton gin.

The frame 10 carries a screen in the form of rods 12 which extend between the top and bottom bars of the frame and are secured therein. The rods 12 are spaced apart in the direction of the length of the frame 10 between the sides 6, so that cotton seed will pass between the rods, while burs or hulls and other matter of like character which it is desirable to separate from the cotton seed gravitate over the screen 12 and escape from the lower end of the screen, it being assumed that the frame 10 is in the inclined position shown in Figs. 3 and 4.

The cotton gin is assumed to be mounted upon a floor 13 or other suitable support, and below the floor are conveyers 14, 15, with the conveyer 14 beneath the screen 12 when the latter is tilted and the conveyer 15 in position to receive burs or the like separated from the cotton seed and discharged from the screen.

There is also provided a board 16 of a size to cover the screen 12 on that face which when the screen is in the inclined position receives seed from the cotton gin. This board 16, which may be termed a seed board, has straps 17 thereon with angle extension 18 to engage over the top bar of the frame 10, and turn buttons 19 or other similar fastening devices serve to hold the board 16 in place in the frame 10, while permitting its ready removal. The board 16 is employed as a deflector for the cotton seed reaching it when it is desired to save the seed from a certain batch of cotton by directing it away from the conveyer 14 and preventing it from passing through the screen 12. This is advantageous where a grower desires to save the cotton seed for planting, since such seed may be directed upon the floor in front of the gin and be gathered, and so mixture of the seed with other seed reaching the conveyer 14 is avoided.

There is also provided an extension member for the hopper comprising end boards 20 and a front board 21 connected at one long edge by hinges 22 to what constitutes the lower corners of the end boards 20 in the installed position of the machine. Each end board 20 has a tongue 23 along its upper edge in position to slide in a corresponding guide strip 24 on the outer face of an end board 6, the length of the board 21 being such that the end boards 20 are slidable lengthwise of the end boards 6 along the outer faces of the latter. The board 21 is normally maintained in an upright closed position by hooks 25 carried by the boards 20. When the board 21 is unhooked and moved on its hinges 22, so as to lie flat on the floor 13 in front of the bar or strip 7, it covers the conveyer 15. When the board 21 is in the upright or closed position and is drawn away from the hopper for a sufficient distance it will inclose the passage to the conveyer 15, so that when the parts are in the position shown in Fig. 4, for instance, material gravitating from the screen or deflector 12 is caused to fall onto the conveyer 15 and is prevented from scattering by the board 21 then upright in front of the conveyer. When the screen 12 is upright and the board 16 is in place, material discharged from the gin cannot reach the conveyer 15 and the board 21 may then be secured in its upright position and moved out of the way close against the frame 10, as shown in Fig. 5, or may be permitted to lie out flat on the floor 13, as shown in Figs. 2 and 3.

The operation of the invention has already been explained in connection with the description of the parts, but it may be briefly repeated that for saving seed for planting from any particular batch of cotton, which is often desired by a planter, the screen 12 is inclined at an angle toward the gin with the board 16 in place, as best shown in Fig. 3, and the board 21 is laid down flat so as to cover the conveyer 15, whereby the cotton seed is directed out upon the floor 13 from which it may be gathered.

Where it is desirable to obtain clean seed, that is, seed not contaminated with husks or burs, the parts are set as shown in Fig. 4, that is, the board 16 is removed, the supplemental member consisting of the end boards 20 and front member 21 is moved out so as to embrace the passage to the hopper 15, and then seed coming from the gin and falling upon the screen 12 passes through the latter to the coyvener 14, while burs or other like contaminating matter is directed toward the board 21 and falls upon the conveyer, or is returned by the board 21 on to the conveyer 15, all as shown in Fig. 4.

When it is desired to deliver the cotton seed and accompanying material to one point of disposal the screen is placed upright, as shown in Fig. 5, with the board 16 in place, and then all of such material passes to the conveyer 14 for transportation to a single place of disposal.

What is claimed is:—

1. An attachment for cotton gins provided with means movable into and out of the path of cotton seed issuing from the gin to direct the seed to one or the other of different conveyers, said means having a screen portion for separating the cotton seed from accompanying burs or other trash, and means for closing one of the conveyers to access of cotton seed directed theretoward.

2. An attachment for cotton gins provided with a tiltable member movable into and out of the path of cotton seed issuing from the gin, said tiltable member having a screen portion for separating the cotton seed from accompanying burs or other trash, and said screen member having a removable board for covering the screen portion to divert the cotton seed.

3. An attachment for cotton gins comprising a hopper structure for interposition in the path of cotton seed issuing from the gin, said hopper structure having a wall movable from an upright position in spaced relation to the gin to a tilted position approaching the gin and then in the path of cotton seed issuing from the gin whereby, when the wall is upright, the cotton seed issuing from the gin is directed toward the gin and when the wall is tilted the cotton seed is directed away from the gin.

4. An attachment for cotton gins comprising a hopper structure for interposition in the path of cotton seed issuing from the gin, said hopper structure having a wall movable from an upright position in spaced relation to the gin to a tilted position approaching the gin and then in the path of cotton seed issuing from the gin, whereby, when the wall is upright, the cotton seed issuing from the gin is directed toward the gin and when the wall is tilted the cotton seed is directed away from the gin, said wall having screen means therein for separating burs and other chaff from the cotton seed and provided with means whereby the screen may be covered from access of the cotton seed thereto in either position of the wall.

5. An attachment for cotton gins comprising a hopper structure for interposition in the path of cotton seed issuing from the gin, said hopper structure having a wall normally in spaced relation to the gin and movable from an upright position to a tilted position in the path of the cotton seed issuing from the gin, whereby to confine the movement of the cotton seed to one direction or to deflect it into another direction, said wall having screen means therein for separating burs and other chaff from the cotton seed, and said wall being provided with a removable board for covering the screen means when the wall is used as a deflector.

6. An attachment for cotton gins comprising a hopper for interposition in the path of cotton seed issuing from the gin, said hopper having a wall on the side remote from the gin movable toward the gin into inclined relation thereto, and another wall exterior to the first-named wall and movable bodily away from the first-named wall on the side thereof remote from the gin and also movable from an upright to a horizontal position.

7. An attachment for cotton gins comprising a hopper for interposition in the path of cotton seed issuing from the gin, said hopper having a wall on the side remote from the gin movable toward the gin into inclined relation thereto, and another wall exterior to the first-named wall and movable bodily away from the first-named wall on the side thereof remote from the gin and also movable from an upright to a horizontal position, said second-named wall having end portions slidable along corresponding end portions of the hopper toward and from the gin.

8. An attachment for cotton gins comprising a hopper structure for interposition in the path of cotton seed issuing from the gin, said hopper being provided with a wall on the side remote from the gin with said wall movable toward the gin into inclined relation thereto and provided with screen means and a cover for the screen means, and a supplemental member comprising a board extending in the direction of the length of the tiltable wall exterior thereto and provided with end members slidable along corresponding end members of the hopper toward and from the gin, the longitudinally disposed board of the supplemental member being hinged thereto for movement from an upright to a horizontal position.

9. An attachment for cotton gins comprising a hopper with end walls and another wall connecting the end walls and located on the side of the hopper remote from the gin in the installed position, means for securing the hopper to the gin, and a supplemental structure comprising end walls slidable along corresponding end walls of the hopper toward and from the gin and provided with a wall extending lengthwise of the hopper and hinged to move from an upright to a horizontal position, said wall of the hopper remote from the gin being hinged to the hopper at its lower edge for movement from an upright position to a tilted position toward the gin, said tiltable wall having screen means therein and a removable cover member for the screen means.

In testimony that I claim the foregoing as my own, I have hereto affixed my signature in the presence of two witnesses.

WILLIAM MARION HENSON.

Witnesses:
J. T. WHEATLEY,
JAS. A. TREEMAN.